Nov. 7, 1933.                J. G. ALLAN                1,934,395
                         INDICATOR ATTACHMENT
                         Filed April 18, 1930
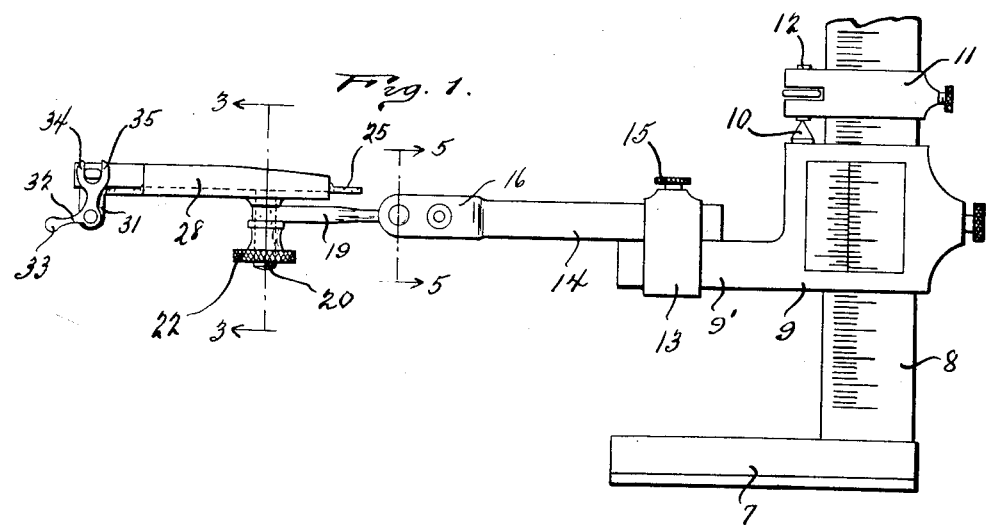
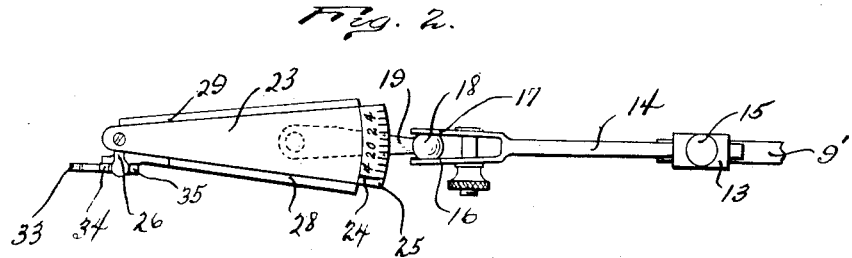
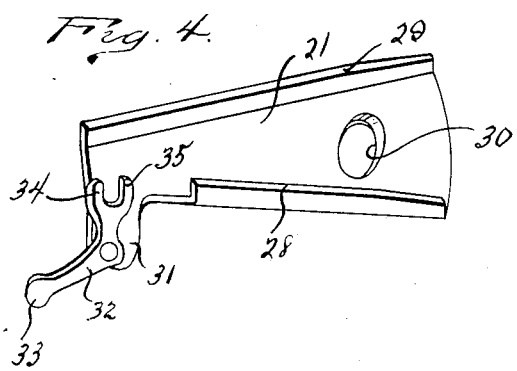
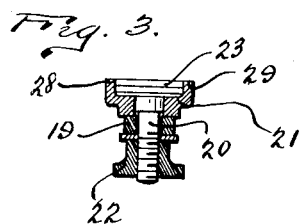
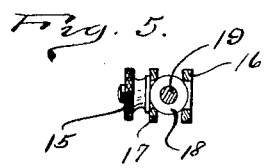
INVENTOR.
John G. Allan.
BY
                    ATTORNEY.

Patented Nov. 7, 1933

1,934,395

UNITED STATES PATENT OFFICE 1,934,395

INDICATOR ATTACHMENT

John G. Allan, Detroit, Mich.

Application April 18, 1930. Serial No. 445,239

4 Claims. (Cl. 33—172)

My invention relates to a new and useful improvement in an indicator attachment adapted for use on test indicators or the like which are used to indicate dimensions and particularly planar surfaces so that the operator may know, in a grinding operation, when the dimensions desired have been reached. With the mounting now used on such test indicators, the graduated portion of the indicator generally is positioned in a vertical plane so that the operator is occasioned considerable trouble in reading the indications on the indicator and is frequently caused to resort to the use of special means for illuminating the graduated face of the indicator in order to read it. Such conditions occasion considerable delay and often result in inaccuracies in the work, due to failure to properly read the indicator. The present invention has for its object an attachment whereby such a test indicator may be mounted so that the graduated face of the indicator will lie in a horizontal plane and in a position easily visible to the operator at all times.

It is another object of the invention to provide an attachment of this class which will be simple in structure, economical of manufacture, and highly efficient in use.

Other objects will appear hereinafter.

The invention consists in the combination and arrangement of parts hereinafter described and claimed.

The invention will be best understood by a reference to the accompanying drawing which forms a part of this specification and in which, Fig. 1 is a side elevational view of the invention applied to a height gauge.

Fig. 2 is a top plan view of the invention.

Fig. 3 is a view taken on line 3—3 of Fig. 1.

Fig. 4 is a perspective view of the retaining plate used in the invention.

Fig. 5 is a view taken on line 5—5 of Fig. 1.

In the drawing I have illustrated the invention used with a height gauge constructed in the usual manner and provided with a base 7 projecting upwardly from which is the graduated column 8 on which is slidably mounted the head 9 carrying the contact point 10 co-operating with the contact point 12 carried by the jaw 11 which is slidable on the column 8. Slidably mounted on the arm 9' and projecting outwardly from the head 9 is an eyelet 13 which, co-operating with the screw 15, serves to clamp the arm 14 on the arm 9'. This arm 14 is provided at its outer end with a bifurcated portion providing the forks 16 and 17 for clamping about a ball 18 mounted on the supporting arm 19. A stud 20 is projected from the base of the test indicator housing 23, and a nut 22 serves to retain the test indicator housing in position on the supporting plate 21 on the supporting arm 19. The test indicator housing is of the usual construction and is provided with the indicating needle 24 co-operating with graduations formed on the extension 25 of the housing base. Projecting outwardly from one end of the test indicator housing 23 is the arm 26 having a contact arm mounted thereon. This contact arm is connected through suitable amplifying mechanism with the needle or pointer 24. Since the mechanism of the test indicator forms no part of the present invention and since it is of a well-known structure, no detailed description of this mechanism is given. Projecting upwardly from opposite sides of the supporting plate are the flanges 28 and 29. An opening 30 is formed in the supporting plate 21 to accommodate the stud 20. Projecting downwardly from one end of the supporting plate 21 is an angularly turned lug 31 on which is pivotally mounted, intermediate its ends, the bell crank 32 having at one end a contact head 33 and at the opposite end is provided with the forks 34 and 35 to provide the yoke in which engages the arm 26.

In use, the device is mounted as shown in Fig. 1 and the contact head 33 will serve to engage the work piece. A rocking of the bell crank 33 will rock the arm 26 and thus serve to actuate the amplifying mechanism which will cause the oscillation of the needle or pointer 24.

In this way, I have provided a mounting whereby the test indicator is held in a position at right angles to its customary position, the test indicator lying in a horizontal plane so that the graduations thereon will always be visible to the operator and the advantages sought, thus obtained. By providing the universal mounting between the forks 17 and 16 with the ball 18, an angular adjustment of the test indicator may be easily and quickly effected to adapt it for use on work pieces of various shapes and forms.

With this construction of an attachment, the test indicator, without being altered in its construction or its assembly may be easily and quickly secured in position on the attachment, or removed therefrom to permit its use in the ordinary manner.

While I have illustrated and described the preferred form of my invention, I do not wish to limit myself to the precise details of structure shown but desire to avail myself of such variations and modifications as may come within the scope of the appended claims.

Having thus described my invention, what I claim as new and desire to secure by Letters Patent is:

1. An indicator attachment of the class described, comprising: a horizontal supporting plate; upwardly projecting flanges on said supporting plate, said plate having an opening adjacent one end between said flanges; a downwardly projecting tongue on one end of said plate at one side thereof; and a bell crank pivotally mounted intermediate its ends on said tongue and forked at one end.

2. A test indicator attachment of the class described, adapted for use with a test indicator having a housing and provided with a lateral projecting contact arm, and an outwardly projecting stud comprising: a horizontal supporting plate for supporting said indicator housing; an upwardly projecting flange at each of two opposite edges of said plate for preventing lateral displacement of said housing on said plate; a supporting arm; means engageable with said stud for attaching said plate on said supporting arm and securing said housing in position on said plate; and a rockable contact arm carried by said plate for rocking, upon its rocking movement, said contact arm.

3. A test indicator attachment of the class described, adapted for use with a test indicator having a housing and provided with a lateral projecting contact arm, and an outwardly projecting stud comprising: a horizontal supporting plate for supporting said indicator housing; an upwardly projecting flange at each of two opposite edges of said plate for preventing lateral displacement of said housing on said plate; a supporting arm; means co-operating with said stud for attaching said plate on said supporting arm and securing said housing in position on said plate; and a rockable contact arm carried by said plate and extending vertically to the plane of said plate for rocking, upon its rocking movement said contact arm.

4. In combination a test indicator having a housing and provided with a laterally projecting arm; a horizontal supporting plate for supporting said indicator housing; an upwardly projecting flange at each of two opposite edges of said plate for preventing lateral displacement of said housing thereon, said plate having an opening formed adjacent one end; a stud projecting from said housing and extending through said opening; a supporting arm connected at one end to said stud; an arm pivotally connected at one end to the end of said supporting arm; a rockable contact arm carried by said supporting plate and connected at one end to said laterally projecting arm on said housing and extending in a plane vertically to the plane of said plate.

JOHN G. ALLAN.